(12) United States Patent
Walsh

(10) Patent No.: US 7,784,630 B2
(45) Date of Patent: Aug. 31, 2010

(54) GASKET FOR HORIZONTAL VENTING AND RELATED METHOD

(75) Inventor: Edward D. Walsh, East Greenwich, RI (US)

(73) Assignee: Dewall Industries, Saunderstown, RI (US)

( * ) Notice: Subject to any disclaimer, the term of this patent is extended or adjusted under 35 U.S.C. 154(b) by 0 days.

(21) Appl. No.: 12/315,678

(22) Filed: Dec. 5, 2008

(65) Prior Publication Data

US 2009/0090689 A1 Apr. 9, 2009

Related U.S. Application Data

(63) Continuation of application No. 11/070,759, filed on Mar. 2, 2005, now Pat. No. 7,461,754.

(60) Provisional application No. 60/549,844, filed on Mar. 3, 2004.

(51) Int. Cl.
*B65D 51/16* (2006.01)
*B65D 53/04* (2006.01)
*B65D 53/02* (2006.01)

(52) U.S. Cl. .................. 215/307; 215/261; 215/348; 215/349; 215/902; 220/366.1; 220/373

(58) Field of Classification Search .................. 215/307, 215/261, 902, 308, 347–349, 310; 220/366.1, 220/371, 373, 367.1
See application file for complete search history.

(56) References Cited

U.S. PATENT DOCUMENTS

| | | | |
|---|---|---|---|
| 3,071,276 A | 1/1963 | Pellett et al. | |
| 3,263,850 A | 8/1966 | Scott | |
| 3,315,831 A | 4/1967 | Scott | |
| 3,319,836 A | 5/1967 | Cubitt | |
| 3,326,401 A | 6/1967 | De Long | |
| 3,448,882 A | 6/1969 | Roy | |
| 3,466,444 A | 9/1969 | Lusk | |
| 3,471,051 A | 10/1969 | Cistone | |
| 3,521,784 A | 7/1970 | Gaines et al. | |
| 3,557,989 A | 1/1971 | Balda | |
| 3,951,293 A | 4/1976 | Schulz | |
| 3,971,489 A | 7/1976 | Welch et al. | |
| 4,044,994 A | 8/1977 | Priese | |
| 4,175,671 A | 11/1979 | Holl et al. | |
| 4,596,338 A | 6/1986 | Yousif | |
| 4,765,499 A | 8/1988 | von Reis et al. | |
| 4,884,716 A | 12/1989 | Steiner | |
| 5,579,936 A | 12/1996 | Costa et al. | |
| 5,598,940 A | 2/1997 | Finkelstein et al. | |
| 5,692,634 A | 12/1997 | Jenkins et al. | |

FOREIGN PATENT DOCUMENTS

EP 1 095 764 A2 5/2001
EP 1 095 764 A3 9/2002

*Primary Examiner*—Anthony Stashick
*Assistant Examiner*—Niki M Eloshway
(74) *Attorney, Agent, or Firm*—McCarter & English, LLP

(57) ABSTRACT

There is provided a gasket element having at least one first inner layer and at least one first outer layer. Each of the at least two layers have differing material properties. The gasket element is well suited to cooperate with an ingress/egress opening of a container that in turn is well suited to retain an active pressure and/or temperature sensitive substance. The gasket element may be operatively connected to a cap element that is suitable to selectively close the at least one ingress/egress opening of the container. The cap element may be a stand alone sealing cap or may be operatively associated with a spray nozzle or the like.

19 Claims, 3 Drawing Sheets

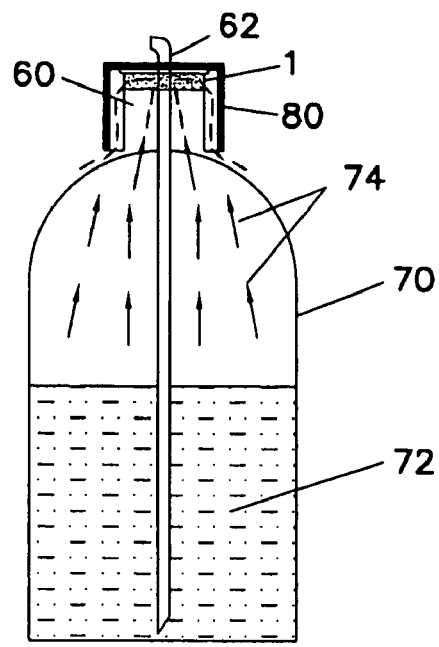
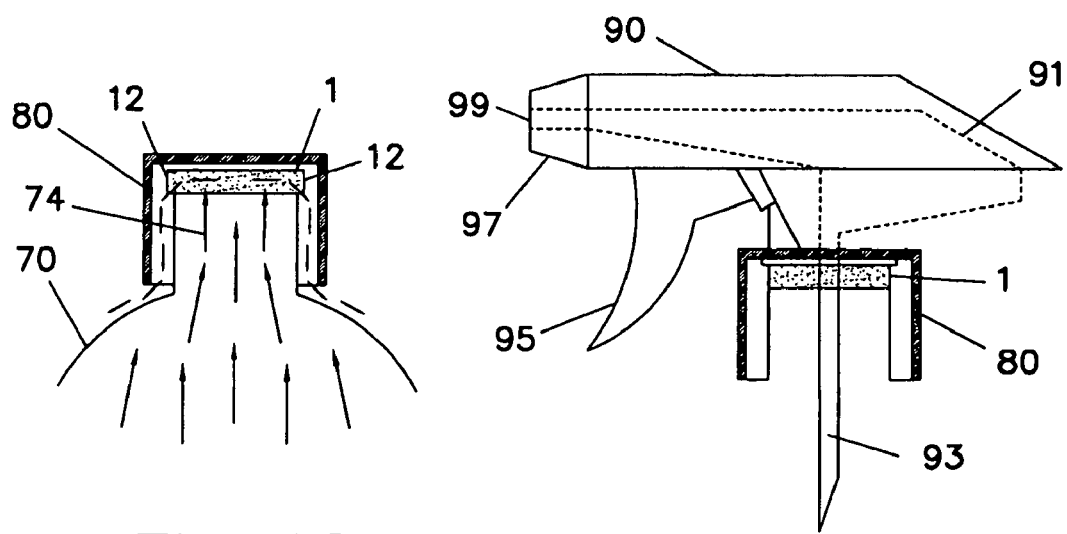

GASKET FOR HORIZONTAL VENTING AND RELATED METHOD

CROSS-REFERENCE TO RELATED APPLICATION

This patent application is continuation of U.S. patent application Ser. No. 11/070,759, filed Mar. 2, 2005, now U.S. Pat. No. 7,461,754 which claims priority from U.S. Provisional Patent Application Ser. No. 60/549,844, filed Mar. 3, 2004, both of which are hereby expressly incorporated by reference as part of the present disclosure.

FIELD OF THE INVENTION

The present invention relates to gasketing elements. More particularly, the present invention relates to a gasket for use with containers that are utilized to retain temperature and/or pressure sensitive substances, and to methods of venting containers with such gaskets.

BACKGROUND INFORMATION

Containers used to retain or store various temperature and/or pressure sensitive substances such as, for example, aqueous solutions, peroxides, chlorines, alcohols, aromatics, ketones, or other chemically active substances, or that are subject to changes in pressure, temperature, altitude and other factors affecting packaging conditions require venting to avoid the negative effects that can result from retaining such sensitive substances in a container. Failure to vent the container and/or inadequate venting thereof may result in a pressure differential between the inside of the container and the outside of the container. This pressure differential may in turn cause the container to collapse, swell and/or leak.

Various venting arrangements have been developed in an effort to reduce or eliminate the negative effects associated with poorly vented containers. For example, it is known to utilize hydrophobic membranes as gasketing elements allowing for the passage of various gases to increase and/or decrease the pressure inside of a container while simultaneously providing a seal for containing a liquid. U.S. Pat. No. 6,602,309 to Vizulis et al. (the "Vizulis '309 patent") and U.S. Pat. No. 3,951,293 to Schultz (the "Schultz '293 patent"), each disclose membrane gasketing elements utilized for vertically venting internal pressure differences of a container. The Vizulis '309 patent discloses a gasketing element or liner having a fluid impermeable layer, a foil layer, a sealing means and a vent patch fixedly attached to a surface of the sealing means for covering a vent hole extending vertically through the liner. The Schultz '293 patent discloses a hydrophobic liner having a film of unsintered tetrafluoroethylene that is supported across a container opening by a perforated sealing diaphragm.

It is also known to utilize a polytetrafluoroethylene (PTFE) liner or an expanded polytetrafluoroethylene (ePTFE) liner as a gasketing element in vertical venting arrangements. PTFE and/or ePTFE liners have a microporous structure that is suitable to repel liquids while safely allowing for the free passage of air or gas to maintain equilibrium in a closed container. These liners typically either cooperate with a venting aperture located in a cap above the liner or have a number of grooves or channels in an upper surface of the liner that cooperate with the threads of a cap to vent the container.

Certain shortcomings associated with the above noted venting arrangements include the limited venting capacity provided by the constrained size of the venting aperture and/or the liner channels and the deficient mechanical properties often associated with the materials utilized in the gasketing element. For example, conventional PTFE can spread out under compressive loads, thereby reducing its ability to provide an effective seal over time. Also, although ePTFE is typically of a higher strength than conventional unexpanded PTFE, it is believed that even further improvements are possible, for example, to ease processing requirements and/or to achieve other desired properties for different gasketing applications. See U.S. Pat. No. 5,964,465 to Mills for a discussion on some of the short comings associated with PTFE and ePTFE.

Accordingly, it is an object of the present invention to provide a solution to one or more of the above noted shortcomings of the prior art. It is a further object of the present invention to provide an improved gasket and method of horizontally venting containers with gaskets.

SUMMARY OF THE INVENTION

These and other objects and advantages of the present invention are achieved by a gasket having at least one first inner layer and at least one first outer layer. The at least one first outer layer may be hydrophobic and may have one or more apertures therethrough. The gasket is well suited to cooperate with an ingress/egress opening of a container that is suitable for retaining an active pressure and/or temperature sensitive substance. The gasket may be operatively connected to a cap that is suitable to selectively close the at least one ingress/egress opening of the container. The cap may be a stand alone sealing cap or may be operatively associated with a spray nozzle or the like. At least one of the layers is a porous, substantially incompressible layer, such as UHMW polyethylene, for venting gas substantially horizontally therethrough from an interior portion to an exterior of the container.

In accordance with one aspect of the present invention, a gasket is provided for sealing an opening in a container, and allowing gas within the container to vent substantially horizontally therethrough. The gasket comprises (i) a first substantially liquid impervious layer, such as PTFE and/or ePTFE, for forming a seal between the gasket and container; and (ii) a second porous, substantially incompressible layer, such as UHMW polyethylene, for venting gas substantially horizontally therethrough from an interior portion to an exterior of the container. In accordance with various currently preferred embodiments of the present invention, the gasket includes plural first and/or second layers, and additional layers, such as resilient foam layers for resiliently compressing the gasket between, for example, a container and a container closure.

Another aspect of the present invention is directed to a gasket for forming a liquid tight seal between a container and container closure and permitting gas to vent therethrough. The gasket comprises (i) first means for forming a substantially liquid-tight seal between the container and container closure; and (ii) second means located between the first means and at least one of the container and container closure for venting gas substantially horizontally through the gasket from an interior to an exterior of the container.

In one embodiment of the present invention, the first means is a substantially liquid impervious, compressible outer layer, such as a PTFE or ePTFE layer. Also in one embodiment of the present invention, the second means is a porous, substantially incompressible inner layer, such as a UHMW polyethylene layer. In one such embodiment, the inner layer defines a porosity within the range of about 10% to about 65% open area. In another embodiment, the inner layer defines a porosity within the range of about 25% to about 35% open area. In one such embodiment, the thickness of the inner layer is within the range of about 4 mils to about 25 mils.

In accordance with another aspect, the present invention is direct to a gasket for sealing an opening in a container, and allowing gas within the container to vent substantially horizontally therethrough. The gasket comprises a first substantially liquid impermeable, gas permeable and compressible layer in fluid communication with the interior of the container for allowing a flow of gas, but preventing a flow of liquid therethrough and for forming a seal between the gasket and container. A second porous substantially incompressible layer defines a first side, a second side, a peripheral surface extending between the first and second sides, an interior portion extending between the first and second sides and peripheral surface, and an open cell structure forming a fluid flow path extending substantially horizontally through the interior portion in fluid communication with the first layer and the peripheral surface of the second layer. A third compressible layer located is either (i) between the first and second layers, or (ii) on an opposite side of the second layer relative to the first layer, for resiliently compressing the gasket between the container and a container closure.

Another aspect of the present invention is directed to a method for substantially horizontally venting a container, comprising the steps of:

(i) providing a container that is suitable to retain pressure and/or temperature sensitive substances, wherein the container has at least one ingress/egress opening;

(ii) providing a closure for selectively closing the at least one ingress/egress opening;

(iii) providing a gasket defining at least one porous substantially incompressible inner layer and at least one substantially compressible, liquid impervious outer layer;

(iv) interposing the gasket between the closure and the ingress/egress opening with the at least one porous substantially incompressible inner layer coupled in fluid communication between the interior and the exterior of the container;

(v) compressing the at least one outer layer of the gasket and forming a substantially liquid-tight seal with the gasket between the interior and the exterior of the container; and (vi) venting gas substantially horizontally through the at least one porous substantially incompressible inner layer between the interior and the exterior of the container.

Another aspect of the present invention also is directed to a method comprising the following steps:

(i) storing a liquid in a container including a body defining a chamber receiving therein the liquid, a container closure, and a gasket defining a porous, substantially compressible, liquid impervious first layer, a porous substantially incompressible second layer defining a first side, a second side, a peripheral surface extending between the first and second sides, an interior portion extending between the first and second sides and peripheral surface, and a tortuous fluid flow path extending through the interior portion, and a third compressible layer located either (i) between the first and second layers, or (ii) on an opposite side of the second layer relative to the first layer;

(ii) interposing the gasket between the closure and the body with the gasket coupled in fluid communication between the chamber and the exterior of the container;

(iii) compressing between the closure and the body the first and third layers of the gasket, but not the second layer of the gasket;

(iv) forming a substantially liquid-tight seal between the compressed first layer of the gasket and the body; and (iv) venting gas from the chamber to the exterior of the container substantially horizontally through the fluid flow path extending through the interior portion of the porous substantially incompressible second layer.

One advantage of the present invention is that the gasket can be utilized to effectively and efficiently improve the venting capacity of a variety of different containers. The substantially horizontal venting of the gasket of the present invention allows for substantially increased flow rates of gases through the gasket in comparison to prior art vertically vented gaskets. Another advantage of the present invention is that the gasket may include two or more layers that cooperate to increase the overall venting surface area. Another advantage of the currently preferred embodiments of the present invention is that they can resist the negative effects associated with excessive and/or repetitive compressive loads. Yet another advantage of the present invention is that the gasket may define any of a variety of different geometries for use in any of a variety of different applications.

These and other objects and advantages of the present invention, and/or of the currently preferred embodiments thereof, will become more readily apparent in view of the following detailed description of the currently preferred embodiments and the accompanying drawings.

BRIEF DESCRIPTION OF THE DRAWINGS

FIG. 11 is a side sectional view of a container in accordance with an illustrative embodiment of the present invention;

FIG. 12 is a side sectional view of a cap in accordance with an illustrative embodiment of the present invention; and FIG. 13 is a side sectional view of a cap in accordance with another illustrative embodiment of the present invention.

DETAILED DESCRIPTION OF THE INVENTION

Figure 1:
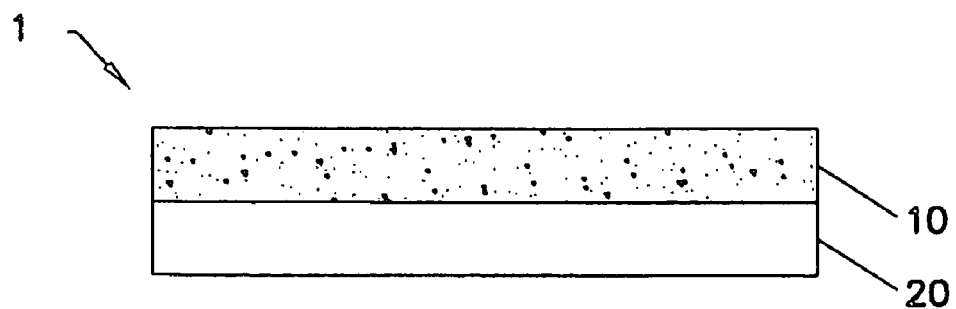
FIG. 1 is a schematic side sectional view of a gasket element in accordance with a first illustrative aspect of the present invention.

Referring to the drawings and, in particular, FIG. 1, a gasket element in accordance with an illustrative embodiment of the present invention is shown and generally represented by reference numeral 1. Gasket 1 essentially has a first inner layer 10 and a first outer layer 20.

The first inner layer 10 may be formed from any of a variety of chemically resilient and/or temperature resistant materials. The first inner layer 10 is preferably formed of a substantially incompressible material. The first inner layer 10 can be woven, non-woven or otherwise formed from various types of fibrous or non-fibrous materials. The first inner layer 10 is preferably porous with an extremely high molecular weight, e.g., in the range of 3.1 million amu or above, to maintain abrasion resistance and strength under extended and/or repetitive compressive loads. The first inner layer 10 is preferably easily handled during manufacture, may be cut or shaped to fit any of a variety of geometries, and may be formed into films as thin as about 0.002 inches. The porosity of the first inner layer 10 may be adjusted as desired to accommodate a variety of application requirements. The porosity of the first inner layer 10 may be uniform in all three axes, which can facilitate constant fluid flow in filtration and/or separation applications. Preferably, the pore size distribution of the first inner layer 10 is very consistent, with nominal values ranging from about 50.0 microns to about 2.5 microns. The first inner layer 10 may preferably be converted from hydrophobic to hydrophilic and vice versa. The first inner layer 10 may also be either oleophilic or oleophobic. The first inner layer 10 may preferably have an open cell (tortuous path) structure with a void volume in the range of about 10% to about 65%. The first inner layer 10 may preferably be bonded to nearly any material, including, for example, polypropylene materials, polyethylene materials, polyester materials, Kevlar®, glass fabrics, and a variety of other materials. An example of an appropriate material for use as the first inner layer 10 is a microporous ultra high molecular weight (UHMW) polyethylene. UHMW polyethylene has a tensile strength in the range of about 1000 to about 4000 psi.

In one embodiment of the present invention, the porosity of the UHMW polyethylene is within the range of about 10% to about 65% open area. In another embodiment of the present invention, the porosity of the UHMW polyethylene is within the range of about 25% to about 35% open area. In one embodiment of the present invention, the UHMW polyethylene layer is about 5 mils thick. In another embodiment of the present invention, the UHMW polyethylene layer defines a thickness within the range of about 3 mils to about 25 mils; and in another embodiment of the present invention, the UHMW polyethylene defines a thickness within the range of about 4 mils to about 15 mils. The present inventor has determined that the thicker the layer of UHMW polyethylene or like porous, substantially incompressible layer (or the overall thickness of such layers for gaskets that include multiple UHMW polyethylene and/or other porous, substantially incompressible layers), the greater is the venting capacity of the gasket (or the higher is the flow rate of gases through the gasket during venting). For example, a gasket including an approximately 7 mil thick UHMW polyethylene or like porous, substantially incompressible layer will vent the same volume of gas more quickly (substantially all other factors being equal) than a like gasket including an approximately 5 mil thick UHMW polyethylene or like porous, substantially incompressible layer. In addition, the present inventor has determined that the greater the porosity of the UHMW polyethylene or like porous, substantially incompressible layer(s), the greater will be the flow rate of gases that pass through the gasket when venting. For example, a gasket including an approximately 5 mil thick UHMW polyethylene or like porous, substantially incompressible layer defining a 50% porosity level (i.e., 50% open area by volume) will vent the same volume of gas more quickly (substantially all other factors being equal) than a like gasket including an approximately 5 mil thick UHMW polyethylene or like porous, substantially incompressible layer defining a 25% porosity level (i.e., 25% open area by volume).

The first outer layer 20 may, similar to the first inner layer 10, be formed from any of a variety of chemically resilient and/or temperature resistant materials. The first outer layer 20 may likewise be woven, non-woven or otherwise formed from various types of fibrous or non-fibrous materials. The first outer layer 20 is preferably hydrophobic or liquid impermeable, easily handled during manufacture, and may preferably be cut or shaped to fit any of a variety of geometries. The first outer layer 20 is preferably usable over a broad temperature range, from as high as about 260° C. to as low as about −268° C. In one aspect of the present invention, the first outer layer 20 may be formed from a low density extruded, unsintered and highly porous material, such as, for example, a polytetrafluoroethylene (PTFE), an expanded PTFE (ePTFE), or variations thereof as is known in the art. The first outer layer 20 can be designed and/or adjusted to accommodate different application requirements. The first outer layer 20, in one aspect of the present invention, may be porous with, for example, a pore size distribution in the range of about 5.0 microns to about 0.05 microns. In one embodiment of the present invention, each PTFE or ePTFE layer defines a porosity within the range of about 20% to about 50% open area (by volume). Further, in another aspect of the present invention, the first outer layer 20 may be converted from the preferred hydrophobic form to a hydrophilic form. The first outer layer 20 may also, like the first inner layer 10, be either oleophilic or oleophobic.

The PTFE or ePTFE layers are relatively soft in comparison to the UHMW polyethylene or like substantially incompressible porous layers. Accordingly, the outer PTFE or ePTFE layers are relatively compressible, and therefore form fluid-tight seals against the surfaces with which they are compressed, such as the container closure and container opening surfaces described further below. The UHMW polyethylene or like substantially incompressible porous layer(s), on the other hand, do not compress when engaged by such container elements (such as the container closure and container opening surfaces described below) or other compressing members. Therefore, even when the gaskets of the present invention are compressed within, for example, a container opening as described further below to form a fluid-tight seal, the UHMW polyethylene or like substantially incompressible porous layer(s) permits any gases to flow therethrough and out of the container. Since the gasket is typically mounted horizontally between the container opening and closure, the UHMW polyethylene or like substantially incompressible porous layer(s) may vent the gases horizontally therethrough in contrast to the vertically venting gaskets as described above. One advantage of the horizontally ventable gaskets of the present invention is that the UHMW polyethylene or other substantially incompressible porous layer(s) may define a significantly greater venting surface area of the gasket with, for example, the sealed chamber of the container, to more rapidly vent gases and/or to vent higher volumes of gases therethrough in comparison to the vertically venting gaskets of the prior art as described above.

Figure 2:
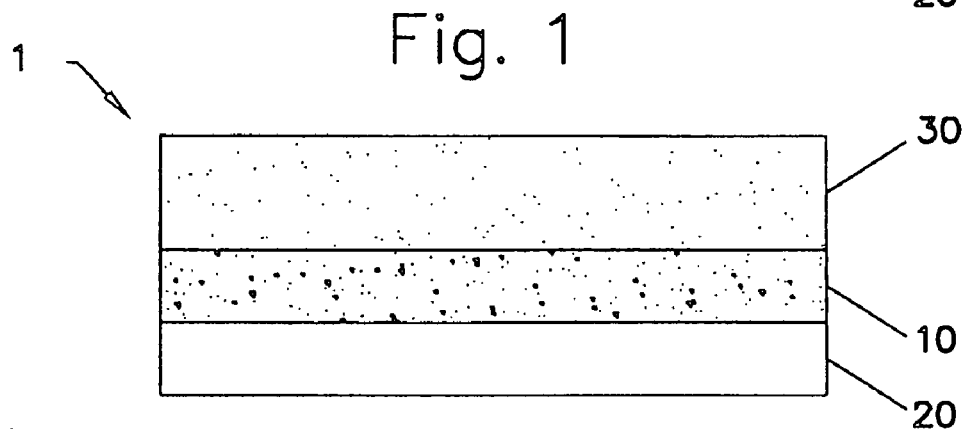
FIG. 2 is a schematic side sectional view of a gasket element in accordance with a second illustrative aspect of the present invention.

Referring to FIG. 2, in another embodiment of the present invention, the first inner layer 10 is preferably positioned over the first outer layer 20 and a second inner layer 30 is preferably positioned over the first inner layer 10 so that the first inner layer 10 is sandwiched between the first outer layer 20 and the second inner layer 30. The second inner layer 30 may be formed from any of a variety of materials having any of a variety of material properties that may be suitable to satisfy a variety of different application requirements. An example of an appropriate material for use as the second inner layer 30 may be compressible foam that, in one exemplary aspect of the present invention, may have a loft or thickness of about 10 mils to about 80 mils. The second inner layer 30 may be in the form of an extruded or co-extruded thermoplastic material. As such, the second inner layer 30 is preferably not subject to delamination. The second inner layer 30 may be a solid or foamed thermoplastic material. Extruded or co-extruded thermoplastic materials preferably suitable for use as the second inner layer 30 include: low density polyethylene, medium density polyethylene, high density polyethylene, polyisobutylene, synthetic olefin rubber, ethylene vinyl acetate, polypropylene, surlyn or polyvinyl chloride (PVC). A preferred thermoplastic material useful as the second inner layer 30 is a co-extruded material comprising a foamed low density polyethylene core between two solid layers of polyethylene. The two solid layers of polyethylene may be high density polyethylene, low density polyethylene or another suitable thermoplastic material. The density of this preferred co-extruded thermoplastic material may be from about 15 to about 50 lbs/cu ft.

The various layers of the gasket 1 may preferably be adhered or connected via any method known to those skilled in the art. For example, the layers may be connected using glue, ultrasonic welding, heat integration cycling, lamination, or any other known process suitable for securing two or more material layers together.

Figure 3:
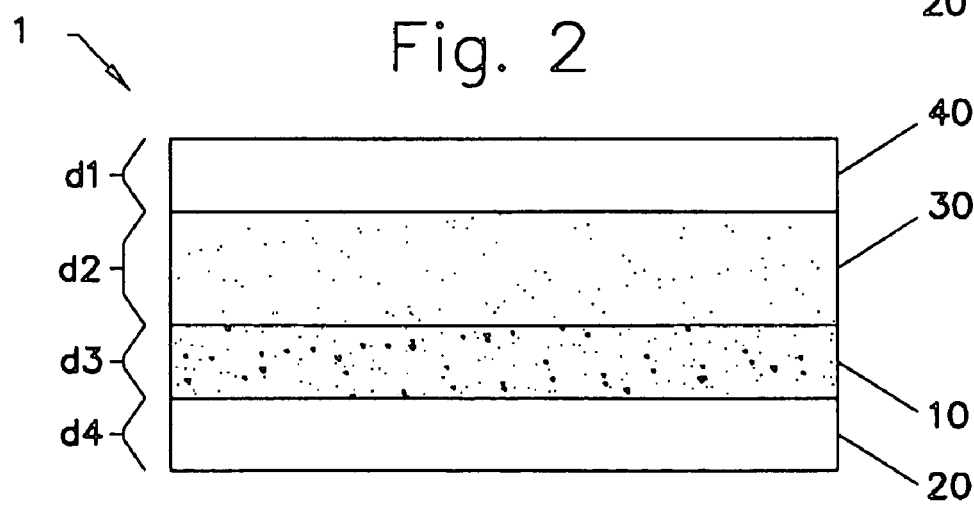
FIG. 3 is a schematic side sectional view of a gasket element in accordance with a third illustrative aspect of the present invention.
Figure 4:
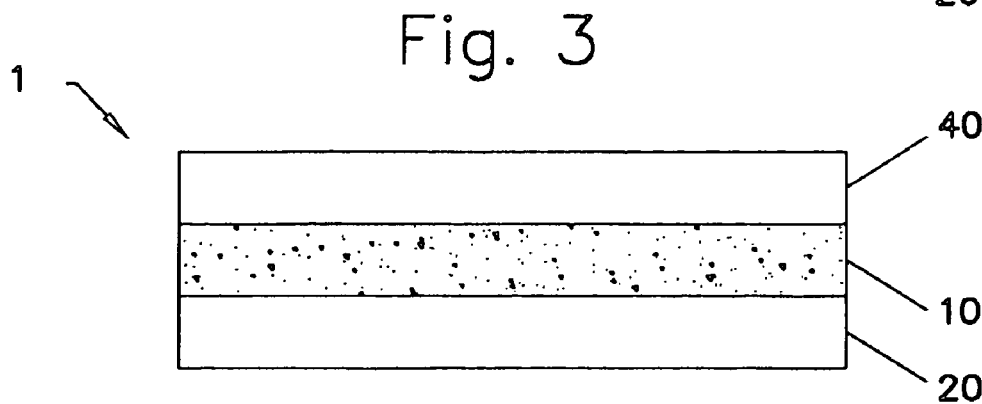
FIG. 4 is a schematic side sectional view of a gasket element in accordance with a fourth illustrative aspect of the present invention.

Referring to FIG. 3, in still another embodiment of the present invention, a second outer layer 40 may be positioned over the second inner layer 30 so that the first and second outer layers 20, 40 preferably sandwich the first and/or second inner layers 10, 30. As shown, each layer 10, 20, 30, 40 may have differing thicknesses or depths d1, d2, d3, d4 to accommodate different application requirements. Further, each layer 10, 20, 30, 40 may have differing material properties associated therewith to likewise accommodate a variety of different application requirements. Still further, as illustrated by FIGS. 1 and 4, neither the second inner layer 30 nor the second outer layer 40 need be included as part of the gasket 1. However, it may be appropriate to include such layers for certain application requirements.

Figure 5:
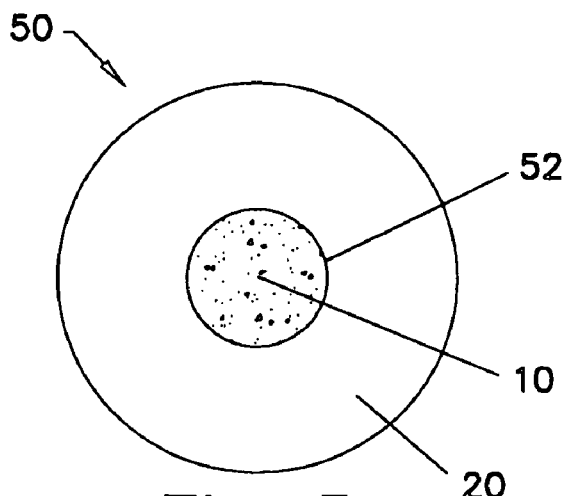
FIG. 5 is a schematic plan view of the gasket element of FIG. 1 in accordance with an illustrative embodiment of the present invention.
Figure 6:
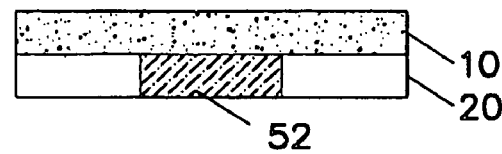
FIG. 6 is a side sectional view of the gasket element of FIG. 5.

Referring to FIGS. 5 and 6, having identified some of the preferred features and/or characteristics of the present invention, in use, gasket 1 may have a solid porous outer layer 20 and a solid porous inner layer 10, each with a different porosity and/or venting capacity. In this aspect of the invention, the first outer layer 20 is preferably at least somewhat more hydrophobic than the first inner layer 10. In another aspect of the present invention, the gasket 1 may be formed into an annular disk 50 or other appropriate shape suitable for cooperating with an ingress/egress opening 60 of a container 70, such as shown in FIGS. 11 through 13. As best shown in FIG. 5, the first outer layer 20 may be provided with a predefined aperture 52 thereby exposing the first inner layer 10. The size and/or shape of the predefined aperture 52 may be adjusted, as desired, to accommodate different venting requirements.

Figure 7:
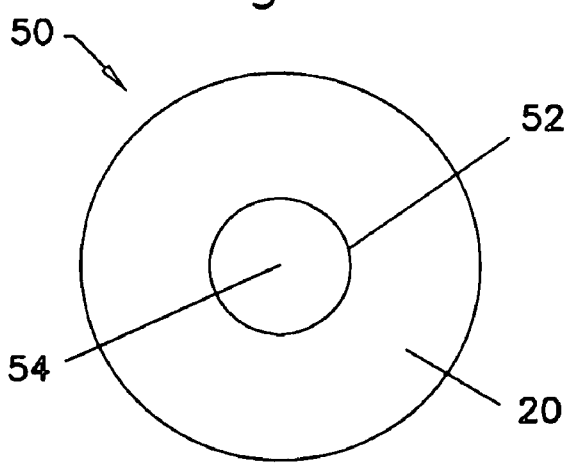
FIG. 7 is a schematic plan view of the gasket element of FIG. 1 in accordance with another illustrative embodiment of the present invention.
Figure 8:
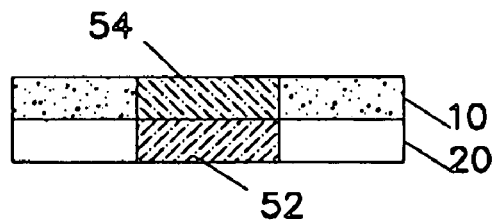
FIG. 8 is a side sectional view of the gasket element of FIG. 7.
Figure 9:
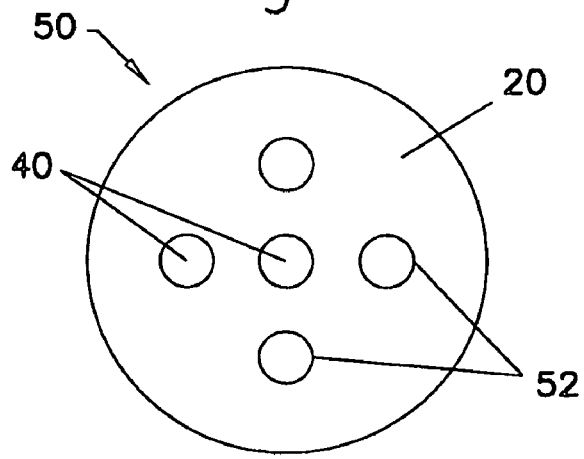
FIG. 9 is a schematic plan view of the gasket element of FIG. 4 in accordance with still another illustrative embodiment of the present invention.
Figure 10:
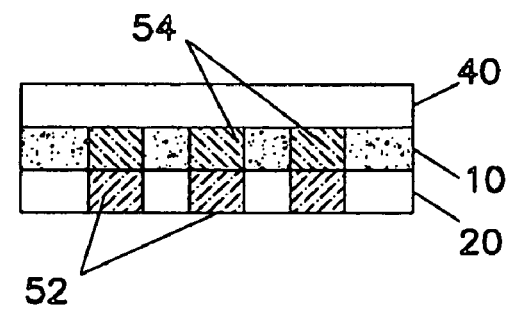
FIG. 10 is a side sectional view of the gasket element of FIG. 9.

Referring to FIGS. 7 and 8, in still another aspect of the present invention, each layer 10, 20 of the gasket 1 may preferably have corresponding predefined apertures 52, 54. The size and/or shape of each aperture 52, 54 may be adjusted as desired to enable a structural element, such as a liquid flow tube 62 shown in FIG. 11, to effectively traverse the gasket 1. In yet other aspects of the present invention, each layer 10, 20, 30, 40 of the gasket 1 can have any of a number of predefined apertures 52, 54 or none at all, as shown in FIGS. 9 and 10.

Referring to FIG. 11, as previously discussed, the gasket 1 may be applied or operatively connected to the container 70 by any known connecting means via the ingress/egress opening 60, such as a cap or other container closure. The container 70 may preferably be suitable for holding any of a variety of temperature and/or pressure sensitive liquid substances 72. The container 70 can be in any of a variety of shapes, sizes and/or configurations and can be formed from any of a variety of preferably chemically resilient and/or temperature resistant materials. The container 70 may also, in other aspects of the present invention, have more than one ingress/egress opening 60, which in turn may have any of a variety of shapes, sizes and/or configurations.

When operatively connecting the gasket 1 to the ingress/egress opening 60, it is preferable to first form the gasket 1 in accordance with desired venting application requirements and then to affix the gasket 1 to the ingress/egress opening 60. Alternatively, the gasket 1 can be formed by aligning each layer thereof over the ingress/egress opening 60 and then bonding or otherwise connecting each layer to one another as well as to the ingress/egress opening 60 of the container 70 substantially at the same time.

Referring to FIG. 12, in one aspect of the present invention, the gasket 1 may be selectively applied or operatively connected to the container 70 via a cap element 80 or other container closure. The gasket 1 may preferably be applied or operatively connected to the cap element 80 by any known means for accomplishing such a task. The cap element 80 may have any of a variety of shapes, sizes and/or configurations suitable to complement and cooperate with the ingress/egress opening 60 of any of a variety of containers 70. In addition, the cap element 80 may be removably connectable to the container 70, such as by threads, a snap-fit or other removable connecting mechanism that is currently known or later becomes known, or the cap element may be fixedly connected to the container, such as by welding, bonding, snap-fit, or other fixed connecting mechanism that is currently known or later becomes known. The gasket 1 either may be fixedly connected to the cap element 80 or removably connected thereto in order to facilitate replacement thereof.

Referring to FIG. 13, in another aspect of the present invention, the cap element 80 may be operatively connected to a liquid transmitting mechanism 90 for selectively transmitting a liquid retained by the container 70. For example, as shown, the liquid transmitting mechanism 90 may be defined by a spray nozzle and pump assembly 91. The pump is operatively connected to a flow tube 93 which is in turn coupled in fluid communication with the substance 72 retained by the container 70. A trigger 95 is operatively coupled to the pump to actuate the pump. A flow control valve 97 defining an outlet aperture 99 is connected in fluid communication with the spray nozzle to open and close the spray nozzle, and if desired, control the flow pattern or other flow characteristics of the spray nozzle. As may be recognized by those of ordinary skill in the pertinent art based on the teachings herein, any of numerous different liquid transmitting mechanisms that are currently known or that later becomes known equally may be employed.

Thus, in a preferred aspect of the present invention, the gasket 1 preferably cooperates directly with the ingress/egress opening 60 and/or indirectly with the ingress/egress opening 60 via the cap element 80 to provide means for horizontally venting a container. In operation, gases 74 emanating from an active substance held in the container 70 may traverse the first outer layer 20, via the porous characteristics thereof and/or via the one or more predefined apertures 52, 54 therein, to enter the first inner layer 10 as shown in FIGS. 11 and 12. The gas 74 may then preferably pass through at least the first inner layer 10 in a substantially horizontal manner to exit an outer perimeter 12 thereof (FIG. 12). Once the gas 74 exits the at least first inner layer 10 it may then, depending on the particular embodiment/aspect of the present invention, pass either through the cap element 80 or directly into the ambient air without the container 70. Likewise, ambient air may enter the container 70 through a reverse process in order to preferably maintain equilibrium within the container 70.

The present invention having been thus described with particular reference to the preferred forms thereof, it will be obvious that various changes and modifications may be made therein without departing from the spirit of the present invention as defined herein. For example, it may be desirable to coat at least one of the layers of the gasket, and preferably the entire gasket or substantially the entire gasket, with a coating of a type known to those of ordinary skill in the pertinent art that repels the passage of solvents, oils, and/or petroleum-based substances through the respective coated portion of the gasket. One advantage of this configuration is that such substances (i.e., solvents, oils, and/or petroleum-based substances) may have a tendency when sufficiently pressurized to wick through one or more layers of a gasket, and therefore such coatings may substantially prevent such wicking from occurring. In addition, it is contemplated that the present invention may be utilized in a variety of different articles, not necessarily limited to storage containers that require venting. Accordingly, this detailed description of the currently preferred embodiments of the present invention is to be taken in an illustrative as opposed to a limiting sense.

What is claimed is:

1. A gasket for sealing an opening in a container, and allowing gas within the container to vent substantially horizontally therethrough, the gasket comprising:
    a first substantially liquid impermeable, gas permeable and compressible layer in fluid communication with the interior of the container for allowing a flow of gas but preventing a flow of liquid therethrough and for forming a seal between the gasket and container;
    a second porous substantially incompressible layer defining a first side, a second side, a peripheral surface extending between the first and second sides, an interior portion extending between the first and second sides and peripheral surface, and an open cell structure forming a fluid flow path extending substantially horizontally through the interior portion in fluid communication with the first layer and the peripheral surface of the second layer; and
    a third compressible layer located either (i) between the first and second layers, or (ii) on an opposite side of the second layer relative to the first layer, for resiliently compressing the gasket between the container and a container closure.

2. A gasket as defined in claim 1, wherein the third layer includes a foam core located between solid outer layers.

3. A gasket as defined in claim 2, wherein the third layer includes a low density polyethylene foam core between two solid layers of polyethylene.

4. A gasket as defined in claim 1, wherein the first layer is substantially formed of at least one of PTFE and ePTFE, and the second layer is substantially formed of UHMW polyethylene.

5. A gasket as defined in claim 1, wherein the second layer defines a porosity within the range of about 10% to about 65% open area.

6. A gasket as defined in claim 1, wherein at least one of the first and second layers is coated with a substance that substantially repels the passage therethrough of at least one of a solvent, an oil and a petroleum-based substance.

7. A gasket as defined in claim 1, wherein the first layer is formed substantially of at least one of PTFE and ePTFE, the second layer is formed substantially of UHMW polyethylene, and the third layer includes a foam core located between solid outer layers.

8. A gasket as defined in claim 7, further comprising a fourth layer located on an opposite side of the third layer relative to the second layer and formed substantially of UHMW polyethylene.

9. A gasket as defined in claim 8, further comprising a fifth layer located on an opposite side of the fourth layer relative to the third layer and formed substantially of at least one of PTFE and ePTFE.

10. A gasket as defined in claim 1, wherein the third layer is located between the first and second layers.

11. A gasket as defined in claim 10, wherein the first layer is substantially formed of at least one of PTFE and ePTFE, the second layer is substantially formed of UHMW polyethylene, and the third layer is a resilient foam layer.

12. A gasket for forming a seal between a container and a container closure and permitting gas to vent substantially horizontally therethrough, the gasket comprising:
    first means in fluid communication with the interior of the container that is substantially liquid impermeable, gas permeable and compressible for allowing a flow of gas but preventing a flow of liquid therethrough and for forming a seal between the gasket and container;
    second means that is substantially incompressible including a first side, a second side, a peripheral surface extending between the first and second sides, and an interior portion extending between the first and second sides and peripheral surface, for forming a tortuous fluid flow path extending substantially horizontally through the interior portion in communication with the first means and the peripheral surface, and for venting gas substantially horizontally through the fluid flow path in the interior portion and through the peripheral surface to an exterior of the container; and
    third means that is compressible and is located either (i) between the first and second means, or (ii) on an opposite side of the second means relative to the first means, for resiliently compressing the gasket between the container and a container closure.

13. A gasket as defined in claim 12, wherein the first means also is for venting a gas substantially vertically therethrough.

14. A gasket as defined in claim 12, wherein the first means is a first substantially liquid impervious, compressible layer, the second means is a second porous, substantially incompressible layer, and the third means is a third compressible foam layer.

15. A gasket as defined in claim 12, wherein the third means is located between the first and second means.

16. A gasket as defined in claim 15, wherein the first means is a layer substantially formed of at least one of PTFE and ePTFE, the second means is a layer substantially formed of UHMW polyethylene, and the third means is a layer including a resilient foam core.

17. A method comprising the steps of:
    storing a liquid in a container including a body defining a chamber receiving therein the liquid, a container closure, and a gasket defining a porous, substantially compressible, liquid impervious first layer, a porous substantially incompressible second layer defining a first side, a second side, a peripheral surface extending between the first and second sides, an interior portion extending between the first and second sides and peripheral surface, and a tortuous fluid flow path extending through the interior portion, and a third compressible layer located either (i) between the first and second layers, or (ii) on an opposite side of the second layer relative to the first layer;

interposing the gasket between the closure and the body with the gasket coupled in fluid communication between the chamber and the exterior of the container;

compressing between the closure and the body the first and third layers of the gasket, but not the second layer of the gasket;

forming a substantially liquid-tight seal between the compressed first layer of the gasket and the body; and venting gas from the chamber to the exterior of the container substantially horizontally through the fluid flow path extending through the interior portion of the porous substantially incompressible second layer.

18. A method as defined in claim 17, wherein the venting step includes venting gas from the chamber substantially vertically through the first layer of the gasket and into the second layer of the gasket, and venting gas in the second layer of the gasket substantially horizontally through the interior portion of the second layer and, in turn, through the peripheral surface of the second layer of the gasket to the exterior of the container.

19. A method as defined in claim 18, further comprising the step of substantially repelling the passage of liquid through the first layer of the gasket.

* * * * *